March 13, 1934.  J. B. MILLIGAN  1,951,197

JOINT CONSTRUCTION

Filed April 26, 1930

INVENTOR
John B. Milligan
BY
Harness, Dickey, Pierce & Hanna,
ATTORNEYS.

Patented Mar. 13, 1934

1,951,197

UNITED STATES PATENT OFFICE 1,951,197

JOINT CONSTRUCTION

John B. Milligan, Columbus, Ohio, assignor to The Columbus Auto Parts Company, a corporation of Ohio Application April 26, 1930, Serial No. 447,460

3 Claims. (Cl. 287—90)

This invention relates to joints particularly of the ball and socket type.

The main objects of this invention are to provide an improved ball and socket joint which will be automatically self-adjusting to compensate for wear therein; to provide a construction of such joint in which a relatively large bearing surface is provided for the ball member; to provide a construction in which the center of the ball member will not be displaced when adjustment takes place due to wear of the parts; and to provide a construction which may be economically manufactured and easily and readily assembled.

An illustrative embodiment of this invention is shown in the accompanying drawing, in which Fig. 1 is a view of my improved construction, partly in elevation and partly in section, taken on the line 1—1 of Fig. 2.

Figure 1:
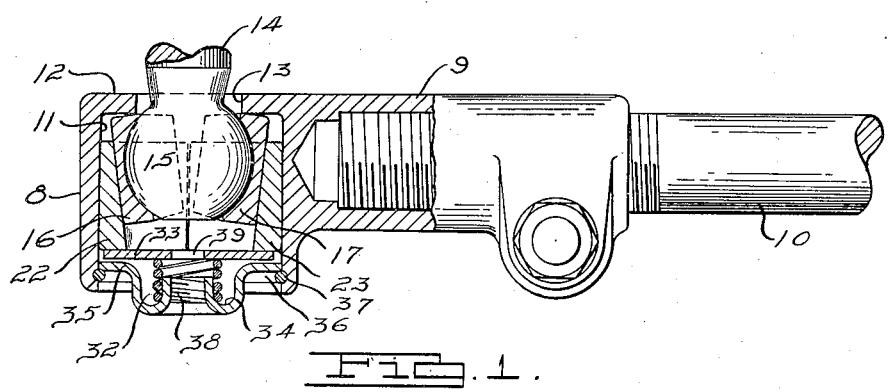
Figure 2:
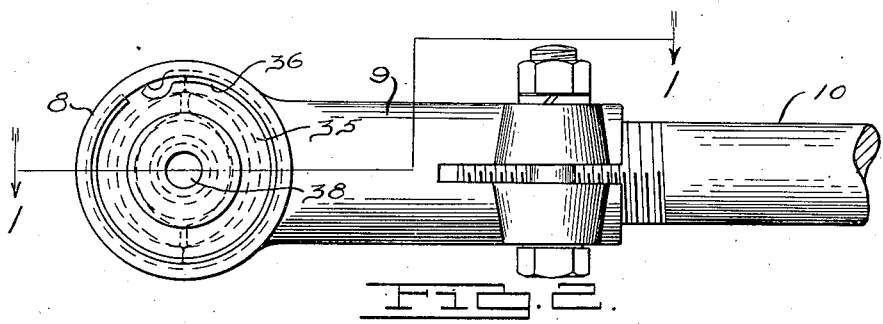
Fig. 2 is a bottom plan view of the same.

Heretofore in the construction of ball and socket joints of the automatically adjustable type it has been customary to provide curved wedges having eccentrically positioned ball seats in their faces arranged to move circumferentially around the inner walls of the outer housing member. These eccentric wedges are usually arranged to move in opposed directions and therefore considerable space must be left initially between their approaching ends so as to provide for adjustment over a long period of use and wear.

Rotation of such eccentric wedges will shift the center of the ball member relatively to the outer housing and if the joint is used in an accurate assembly it will soon become out of adjustment by reason of such movement of the ball center.

In my improved construction disclosed herein the ball member is embraced by a pair of socket members which have a relatively large bearing area on the ball. These socket members are in turn embraced by a pair of substantially semi-cylindrical wedge members which are axially slidable in the opening provided in the outer housing. Spring means are provided for urging the wedge members to press the socket members snugly around the ball.

The movement of the wedge members is axially with respect to the annular opening in the housing and the movement of the socket members is radially toward the center of the ball, therefore the center of the ball does not shift or displace with respect to its original position in the housing member.

In the construction shown in the drawing, an outer housing member 8 having a hollow interiorly threaded shank 9 thereon for receiving a tie rod or the like 10, is provided with an annular opening 11 therethrough having a cylindrical wall. An inturned flange 12 is provided at the upper end of the opening 11, thus providing an annular opening 13 through which projects a shank 14 integrally formed on an inner bearing member or ball 15.

The ball 15 is positioned centrally within the annular opening 11 with respect to its longitudinal axis and is embraced by a pair of inner intermediate or socket members 16 and 17 which have outer surfaces 18 and 19, respectively, formed on a uniform radius so as to be substantially semi-cylindrical in shape. The inner sides of the socket members are provided with ball seat sockets 20 and 21, concentrically formed with respect to their outer cylindrical sides.

Means are provided for tightening the socket members 16 and 17 around the ball 15 and comprise a pair of outer intermediate or wedge members 22 and 23 which have outer surfaces 24 and 25 respectively formed on a uniform radius, that is, substantially semi-cylindrical in shape, so as to fit the annular opening 11; and inner surfaces 26 and 27 respectively of uniform radius, that is, of substantially cylindrical shape, so as to fit the outer sides of the socket members 16 and 17. The axes of the inner and outer surfaces of the outer intermediate or wedge members are angularly disposed with respect to each other, thus forming wedge members having inner and outer cylindrical walls, the inner of which support the socket members in upward, outwardly slanting or diverging position as shown in Fig. 1 of the drawing.

Figures 3, 4:
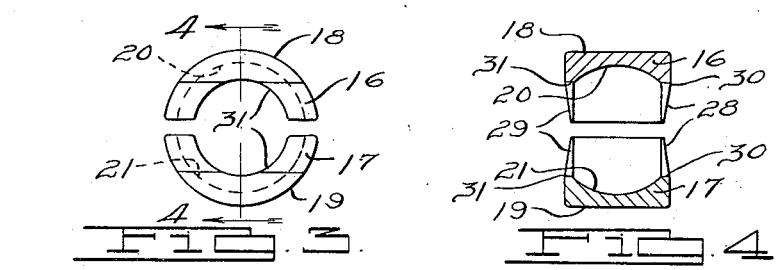
Fig. 3 is a view in top plan of the two socket members which embrace the ball member.
Fig. 4 is a sectional view taken on the line 4—4 of Fig. 3.
Figures 5, 6:
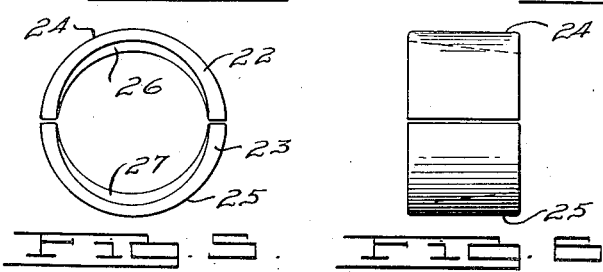
Fig. 5 is a top plan view of the semi-cylindrical wedge members which adjust the socket members around the ball.
Fig. 6 is a view in side elevation of the same.

The socket members 16 and 17 are trimmed off adjacent their ends as shown at 28 and 29 in Fig. 4 so that when in abutting position against the inturned flange 12 they rest on their medial points 30 or 31, depending upon which end of the socket members is assembled in an upward position.

Means are provided for automatically moving the wedge members 22 and 23 axially within the annular opening 11 toward the flange 12 and comprise a helical compression spring 32, the upper end of which bears against a follower plate 33 loosely fitted in the opening 11 and bearing against the wedge members 22 and 23 around its marginal edge.

The lower end of spring 32 is seated in an annular groove 34 formed in a closure plate or cap 35 which is retained in the lower end of the opening 11 by an expanding spring lock ring 36 seated in a semi-circular groove formed around the inner periphery of the opening 11 closely adjacent the lower end thereof.

The middle portion of the closure cap 35 is drawn out axially to provide an inner wall for the groove 34 and the center is cut away to provide an opening through the closure plate which is interiorly threaded at 38 for receiving an exteriorly threaded lubricant fitting. The follower plate 33 is also provided with a central opening 39 so that lubricant may readily pass into the space immediately below the ball 15 and thence up around the ball to thoroughly lubricate the parts.

This ball and socket joint is assembled as shown in Fig. 1 of the drawing with the socket members 16 and 17 abutting against the inturned flange 12. The wedge members 22 and 23 are inserted through the bottom of the opening 11 and when snugly contacting with the outer sides of the socket members cause them to rotate on the ball 15 so that their upper ends diverge in an upward direction.

The follower plate 33 is constantly urged against the wedge members 22 and 23 by the compression spring 32 which is seated in the annular groove 34 of the closure cap 35. The closure cap 35 is retained by the spring lock ring 36 which is seated in the semi-circular peripheral groove 37 formed in the inner face of the opening 11, at the lower end thereof.

When wear occurs of either the ball or socket members, the wedges 22 and 23 will automatically move upwardly or axially relative to the socket members and cause such socket members to tighten or close in radially around the ball member 15.

By reason of the outer sides of the socket members being formed on a uniform radius which is substantially the same as the inner surface of the wedge members 22 and 23, these members will fit properly regardless of how far the wedge members may travel upwardly in the housing.

Although but one specific embodiment of this invention has been herein shown and described, it will be understood that numerous details of the construction may be altered or omitted without departing from the spirit of this invention as defined by the following claims.

What I claim is:

1. A ball joint comprising an outer housing member having an opening therein and an internal cylindrical wall, a stationary shoulder constituting an abutment adjacent the opening in said housing; a ball and shank member having the ball portion thereof located within said housing and the shank extending through said opening; ball seats embracing opposite sides of said ball and having ends arranged to abut said shoulder, the outer side wall of each of said ball seats being cylindrical and each of said ball seats being arranged with the axes of said cylindrical surfaces diverging one from the other in the direction of said ball shank; cooperating wedge members having inner surfaces of cylindrical conformation for engagement with the outer cylindrical surfaces of said ball seats, the outer surfaces of said wedge members being cylindrical to fit the cylindrical inner wall of said housing, and means for moving said wedge members longitudinally relative to said ball and shank in said housing and maintain said ball seats against said shoulder without moving said ball and shank relative to said housing.

2. A ball joint comprising an outer housing member having an opening therein and an internal cylindrical wall, a stationary shoulder constituting an abutment adjacent the opening in said housing; a ball and shank member having the ball portion thereof located within said housing and the shank extending through said opening; ball seats embracing opposite sides of said ball and having ends arranged to abut said shoulder, the outer side wall of each of said ball seats being of cylindrical curvature and each of said ball seats being arranged with the axes of said cylindrical surfaces diverging one from the other in the direction of said ball shank; wedging means cooperating therewith, the inner surface of said means being formed with diverging cylindrical configuration for complemental engagement with the outer cylindrical surfaces of said ball seats, the outer configuration of said wedging means being of cylindrical curvature with the axis of said last mentioned surface configuration being substantially in alignment with the axis of the inner cylindrical wall of said housing, and spring means for moving said wedging means longitudinally relative to said ball and shank in said housing, said inner diverging cylindrical configuration of said wedging means defining a space non-circular in cross section to prevent rotation of said seats relative to said wedging means.

3. A ball joint comprising an outer housing member having an opening therein and an internal cylindrical wall, a stationary shoulder constituting an abutment adjacent the opening in said housing, a ball and shank member having the ball portion thereof located within said housing and the shank extending through said opening; ball seats embracing opposite sides of said ball and having ends arranged to abut said shoulder, the outer side wall of each of the ball seats being of cylindrical curvature and each of said ball seats being arranged with the axes of said cylindrical surfaces diverging one from the other in the direction of the ball shank; wedging means cooperating therewith, the inner surface of said wedging means being of cylindrical conformation for engagement with the outer cylindrical surfaces of said ball seats, the outer surface of said wedging means being of cylindrical curvature with the axis of said last mentioned surface being substantially in alignment with the axis of the inner cylindrical wall of said housing; a disc positioned adjacent said wedging means; a closure for the opening in said housing positioned adjacent said disc, said closure having a depressed portion; and spring means contained in said depressed portion for urging said wedging means longitudinally relative to said ball and shank in said housing.

JOHN B. MILLIGAN.